(12) United States Patent
Knospe et al.

(10) Patent No.: US 10,811,923 B2
(45) Date of Patent: Oct. 20, 2020

(54) DRIVE ASSEMBLY

(71) Applicant: Magna Powertrain Bad Homburg GmbH, Bad Homburg (DE)

(72) Inventors: Dennis Christian Knospe, Linz (AT); Gerd Schlager, Kefermarkt (AT); Daniel Schleicher, St. Valentin (AT); Christoph Sigmund, Sierning (AT)

(73) Assignee: HANON SYSTEMS EFP DEUTSCHLAND GMBH, Bad Homburg, V. D. Höhe (DE)

( * ) Notice: Subject to any disclaimer, the term of this patent is extended or adjusted under 35 U.S.C. 154(b) by 109 days.

(21) Appl. No.: 16/091,563

(22) PCT Filed: Mar. 23, 2017

(86) PCT No.: PCT/EP2017/056935
§ 371 (c)(1),
(2) Date: Oct. 5, 2018

(87) PCT Pub. No.: WO2017/178207
PCT Pub. Date: Oct. 19, 2017

(65) Prior Publication Data
US 2019/0109508 A1    Apr. 11, 2019

(30) Foreign Application Priority Data

Apr. 12, 2016 (DE) .................. 10 2016 206 085

(51) Int. Cl.
*H02K 3/50* (2006.01)
*H02K 11/33* (2016.01)
(Continued)

(52) U.S. Cl.
CPC .............. *H02K 3/50* (2013.01); *H02K 3/522* (2013.01); *H02K 11/33* (2016.01); *H02K 15/0062* (2013.01)

(58) Field of Classification Search
CPC .......... H02K 3/50; H02K 11/33; H02K 3/522; H02K 15/0062
(Continued)

(56) References Cited

U.S. PATENT DOCUMENTS

| 6,028,386 A | 2/2000 | Kech et al. |
| 7,042,124 B2 * | 5/2006 | Puterbaugh .............. H02K 5/10 |
| | | 310/43 |

(Continued)

FOREIGN PATENT DOCUMENTS

| DE | 8504147 U1 | 10/1988 |
| DE | 19705974 A1 | 8/1998 |

(Continued)

OTHER PUBLICATIONS

International Search Report and Written Opinion dated May 26, 2017 from corresponding International Patent Application No. PCT/EP2017/056935 with English translation of International Search Report.

(Continued)

*Primary Examiner* — Jeremy A Luks
(74) *Attorney, Agent, or Firm* — Dickinson Wright PLLC

(57) ABSTRACT

Drive arrangement (1) comprising an electrical machine (2) having at least one winding (3) which has at least one winding end (4), and comprising a control unit (5), wherein the control unit (5) has a housing (6) with at least one contact-making receiving opening (7), wherein the electrical machine (2) and the control unit (5) can be mechanically connected, and wherein at least one winding end (4) of the winding (3) of the electrical machine (2) can be guided into the contact-making receiving opening (7) and can be clamped in the contact-making receiving opening (7) by means of a displaceable sliding part (5) and/or a deformable (Continued)

bending part (9), so that electrical contact can be established between the electrical machine (2) and the control unit (5).

7 Claims, 10 Drawing Sheets

(51) Int. Cl.
*H02K 15/00* (2006.01)
*H02K 3/52* (2006.01)

(58) Field of Classification Search
USPC .......................................................... 310/71
See application file for complete search history.

(56) References Cited

U.S. PATENT DOCUMENTS

| | | | |
|---|---|---|---|
| 7,215,052 B2* | 5/2007 | Blase | F02M 37/08 |
| | | | 310/254.1 |
| 8,866,356 B2* | 10/2014 | Kohara | H02K 11/33 |
| | | | 310/68 B |

| | | | |
|---|---|---|---|
| 2006/0006094 A1 | 1/2006 | Hofmann et al. |
| 2011/0037331 A1 | 2/2011 | Jang et al. |
| 2012/0229005 A1 | 9/2012 | Tominaga et al. |

FOREIGN PATENT DOCUMENTS

| | | |
|---|---|---|
| DE | 19812729 A1 | 9/1999 |
| DE | 202004010513 U1 | 11/2005 |
| DE | 102004063814 A1 | 7/2006 |
| DE | 112005000816 T5 | 3/2007 |
| DE | 102004030809 B4 | 10/2008 |
| DE | 202008014658 U1 | 1/2009 |
| EP | 2512008 A1 | 10/2012 |

OTHER PUBLICATIONS

Search Report dated Feb. 14, 2017 from corresponding German Patent Application No. 102016206085.6.

* cited by examiner

DRIVE ASSEMBLY

CROSS-REFERENCE TO RELATED APPLICATIONS

This application is a National Stage of International Patent Application No. PCT/EP2017/056935, filed Mar. 23, 2017, which claims the benefit and priority of German Patent Application No. DE 10 2016 206 085.6 filed Apr. 12, 2016. The entire disclosures of each of the above applications are incorporated herein by reference.

FIELD OF THE INVENTION

Drive arrangement comprising an electrical machine having at least one winding which has at least one winding end, and comprising a control unit, wherein the control unit has a housing with at least one contact-making receiving opening, wherein the electrical machine and the control unit can be mechanically connected, and wherein at least one winding end of the winding of the electrical machine can be guided into the contact-making receiving opening.

BACKGROUND OF THE INVENTION

This section provides information related to the present disclosure which is not necessarily prior art.

The construction of an abovementioned drive arrangement is often associated with complicated electrical connection work between the electrical machine and the control unit requiring a large number of components.

One of the most common methods for making electrical contact with an electrical machine by way of a control unit, more precisely by way of a printed circuit board of a control unit, involves soldering the printed circuit board of the control unit to contact elements, usually in the form of contact pins, of the electrical machine, more precisely to the windings of the electrical machine. In this case, the printed circuit board of the control unit has to be fully accessible. A modular construction of the actuator arrangement, in the case of which both the electrical machine and also the control unit are manufactured as individual modules and are connected by a simple mechanical and electrical connecting process to form the drive arrangement, is not possible in this way.

An alternative, but expensive, option is the use of a conventional plug-in connecting system.

Document DE 198 12 729 A1 describes, for example, an electric motor comprising a drive unit and a control unit, in which the control unit and the drive unit are prefabricated in a modular manner and are assembled with one another in this way. The drive unit is designed as an electric motor and has a stator, a rotor and at least one electrical coil. The windings of the electrical coil end in contact pins which protrude through corresponding openings of a stator flange. A control unit is arranged on the rear side of the stator flange, said control unit having a control housing which has a recess in which the connection elements (contact pins of the electrical coil) are arranged. The contact elements of the control unit in the form of contact sockets or contact forks are arranged in the recess. In the case of an embodiment of this kind, dummy contact-connection of the electrical machine and the control unit is difficult to carry out and reliable contact-connection over the entire service life of the electric motor is difficult.

SUMMARY OF THE INVENTION

This section provides a general summary of the disclosure, and is not a comprehensive disclosure of its full scope or all of its features.

An object of the invention is to specify an alternative drive arrangement comprising an electrical machine and a control unit, which drive arrangement allows simple electrical contact-connection, in particular dummy contact-connection, between the electrical machine and the control unit, and also ensures reliable operation over its service life.

The object is achieved by a drive arrangement comprising an electrical machine having at least one winding which has at least one winding end, and comprising a control unit, wherein the control unit has a housing with at least one contact-making receiving opening, wherein the electrical machine and the control unit can be mechanically connected, and wherein at least one winding end of the winding of the electrical machine can be guided into the contact-making receiving opening and can be clamped in the contact-making receiving opening by means of a displaceable sliding part and/or a deformable bending part, so that electrical contact can be established between the electrical machine and the control unit.

According to the invention, the drive arrangement comprises an electrical machine and a control unit.

According to the invention, the electrical machine has at least one winding with at least one winding end. The winding is formed, for example, from wire and the winding end is accordingly formed as a wire end.

The control unit of the drive arrangement serves to supply current to the electrical machine. Depending on the configuration and complexity of the control unit, further functions, such as open-loop current control and/or closed-loop current control, position and/or rotation speed measurement, temperature measurement etc. for example, can also be implemented in the control unit.

According to the invention, the control unit has a housing, wherein at least one contact-making receiving opening is formed in the housing. Electrical contact can be made with the control unit via the contact-making receiving opening.

According to the present invention, the electrical machine is mechanically and electrically connected to the control unit.

According to the invention, the electrical connection between the electrical machine and the control unit is performed by at least one winding end of the winding of the electrical machine being guided into the contact-making receiving opening and being clamped in the contact-making receiving opening by means of a sliding part and/or a bending part.

The design according to the invention of the drive arrangement constitutes a drive arrangement which is particularly simple in respect of its construction and in respect of its production. In particular, electrical contact-connection between the electrical machine and the control unit is achieved in a simple manner owing to the configuration of the drive arrangement according to the invention. Furthermore, the embodiment according to the invention of the drive arrangement allows a modular construction, as a result of which firstly the production of the drive arrangement is simplified and secondly costs can be reduced.

Developments of the invention are specified in the dependent claims, the description and the appended drawings.

The bending part is preferably designed such that it deforms during the process for mechanically connecting the electrical machine and the control unit.

The sliding part is preferably designed such that it is displaced during the process for mechanically connecting the electrical machine and the control unit.

The sliding part and the bending part can each be in the form of a separate component or integrally formed, depending on the design variant of the drive arrangement according to the invention.

In a preferred embodiment of the present invention, the bending part is integrally formed with the housing of the electrical machine.

In a further preferred design variant of the present invention, the sliding part and/or bending part are/is in the form of an insert part.

The mechanical connection of the electrical machine and the control unit is preferably performed by means of a plug-in connection. In addition to this type of interlocking mechanical connection, force-fitting and materially bonded mechanical connections are also conceivable.

The connection partners, specifically the electrical machine and the control unit, can be mechanically connected in a simple, quick and reliable manner by means of the plug-in connection.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION

The drive arrangement 1 according to the invention comprises an electrical machine 2 and a control unit 5.

Figure 1:
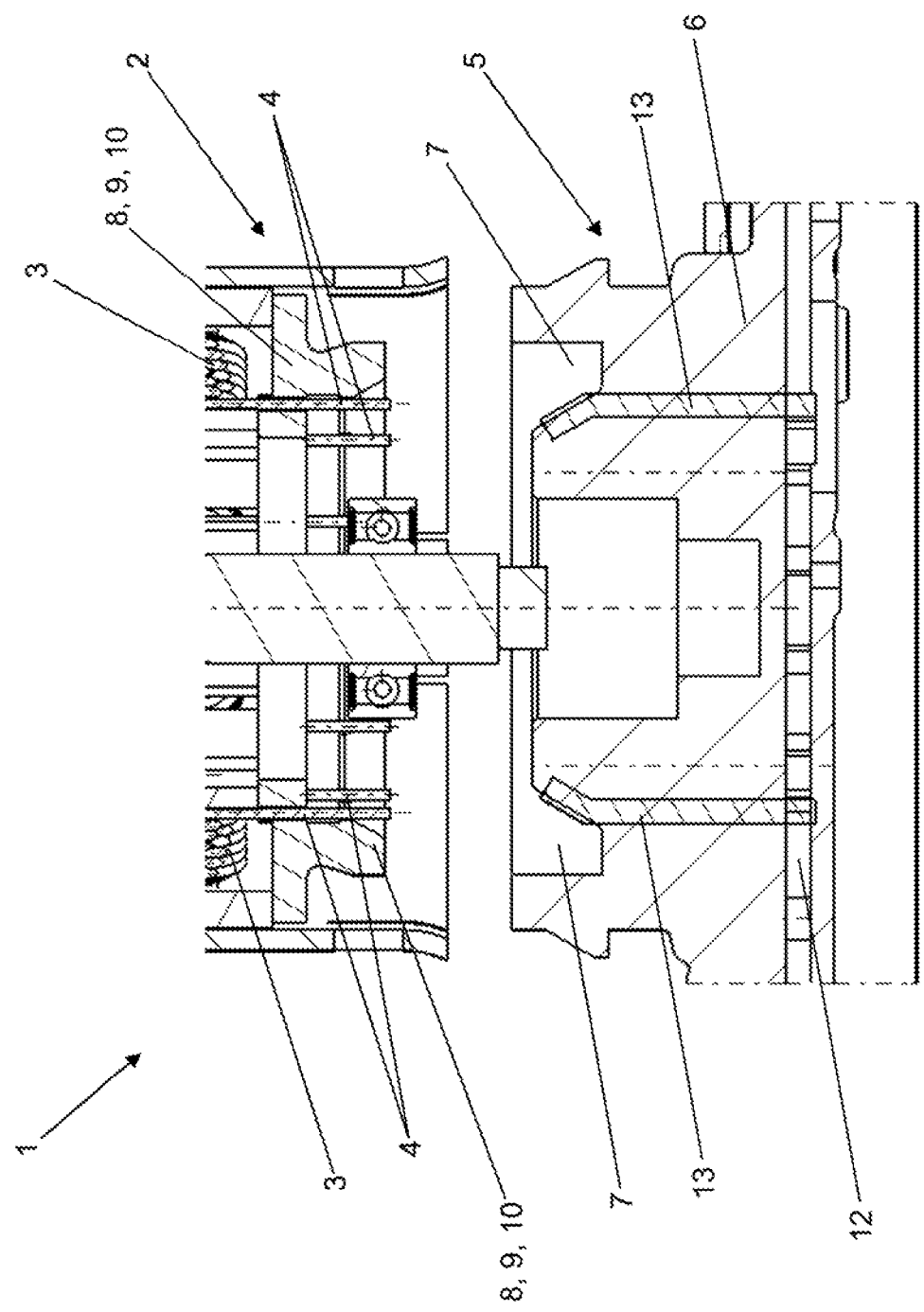
FIG. 1 shows a sectional view of a first design variant of an exemplary drive arrangement, wherein the electrical machine and the control unit are neither mechanically nor electrically connected.

The electrical machine 2 has a plurality of windings 3, each with at least one winding end 4—two windings 3, each with two winding ends 4, are shown in FIG. 1 by way of example. The windings 3 are formed from metal wire, as a result of which the winding end 4 corresponds to a wire end.

The winding 3 of the electrical machine 2 is an electrical coil.

The control unit 5 has a housing 6 and a printed circuit board 12, wherein the printed circuit board 12 is encased by the housing 6. In FIG. 1, two contact-making receiving openings 7 are formed in the housing 6. A contact element 13 is exposed in each of the contact-making receiving openings 7, said contact element being electrically connected to the printed circuit board 12 of the control unit 5 at one end and opening into the respective contact-making receiving opening 7 at the other end, for electrical contact to be made by a contact partner, specifically the respective winding end 4, in the respective contact-making receiving opening 7.

The electrical machine 2 and the control unit 5 can be mechanically connected to one another by means of a plug-in connection 11.

Figure 2:
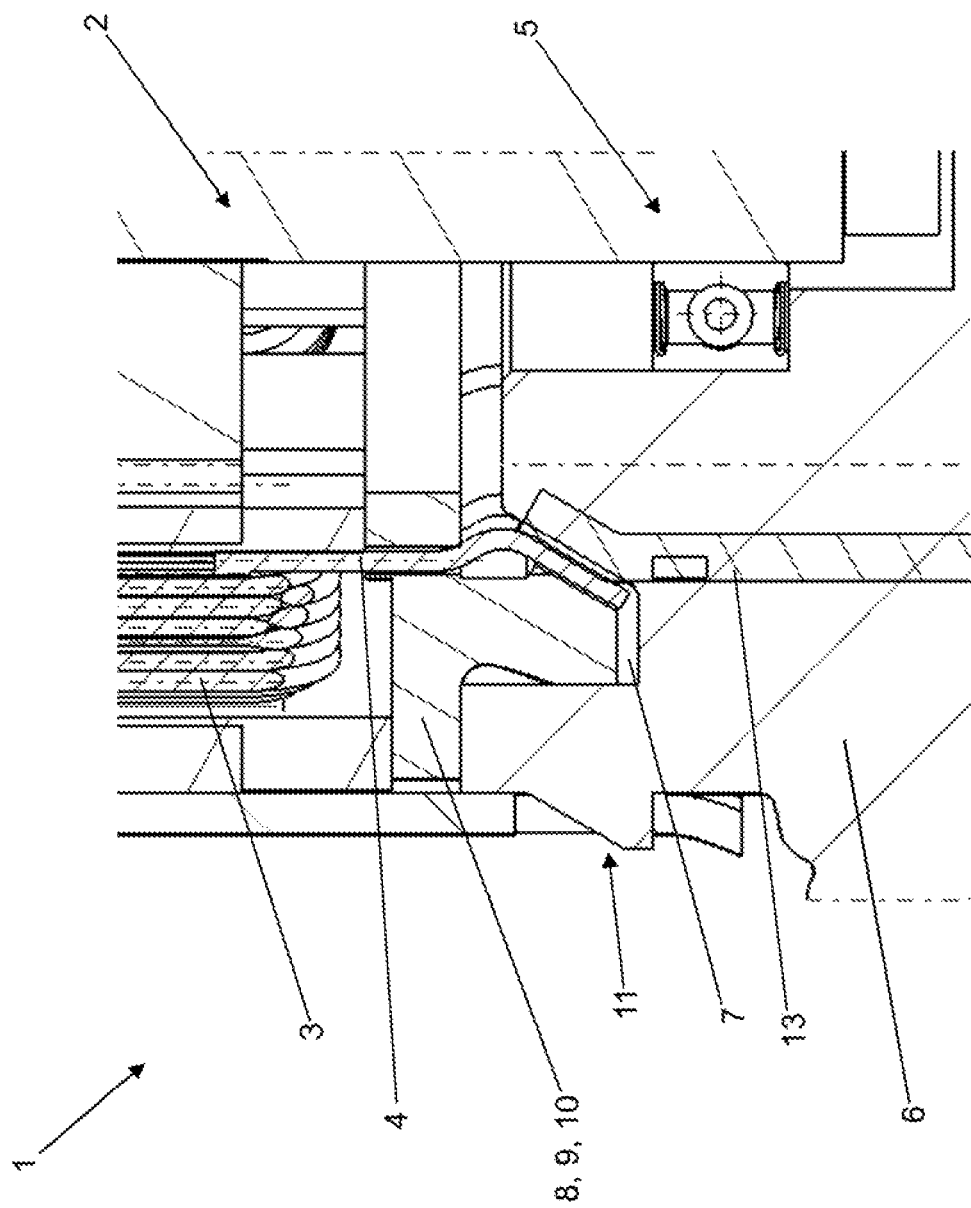
FIG. 2 shows a view of a detail of the first design variant of a drive arrangement according to FIG. 1, wherein the electrical machine and the control unit are mechanically and electrically connected.
Figure 7:
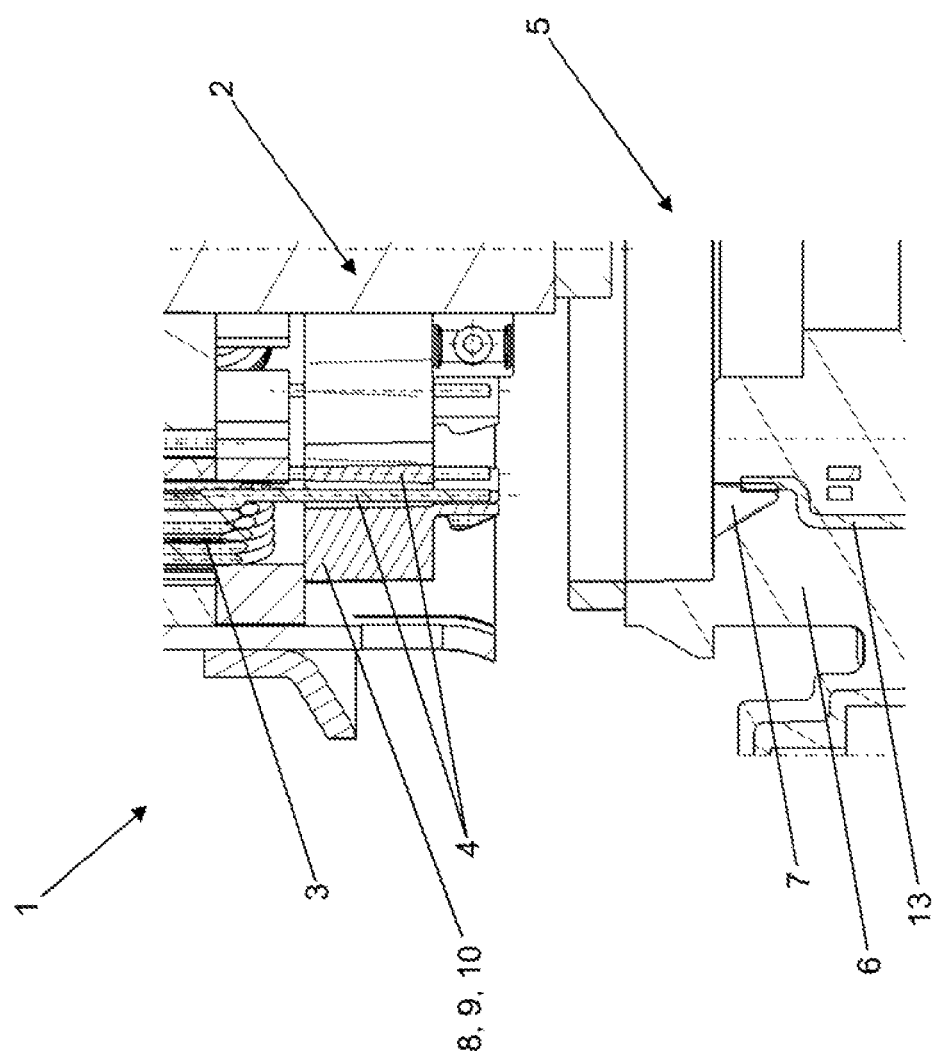
FIG. 7 shows a sectional view of a fourth design variant of an exemplary drive arrangement, wherein the electrical machine and the control unit are neither mechanically nor electrically connected.
Figure 8:
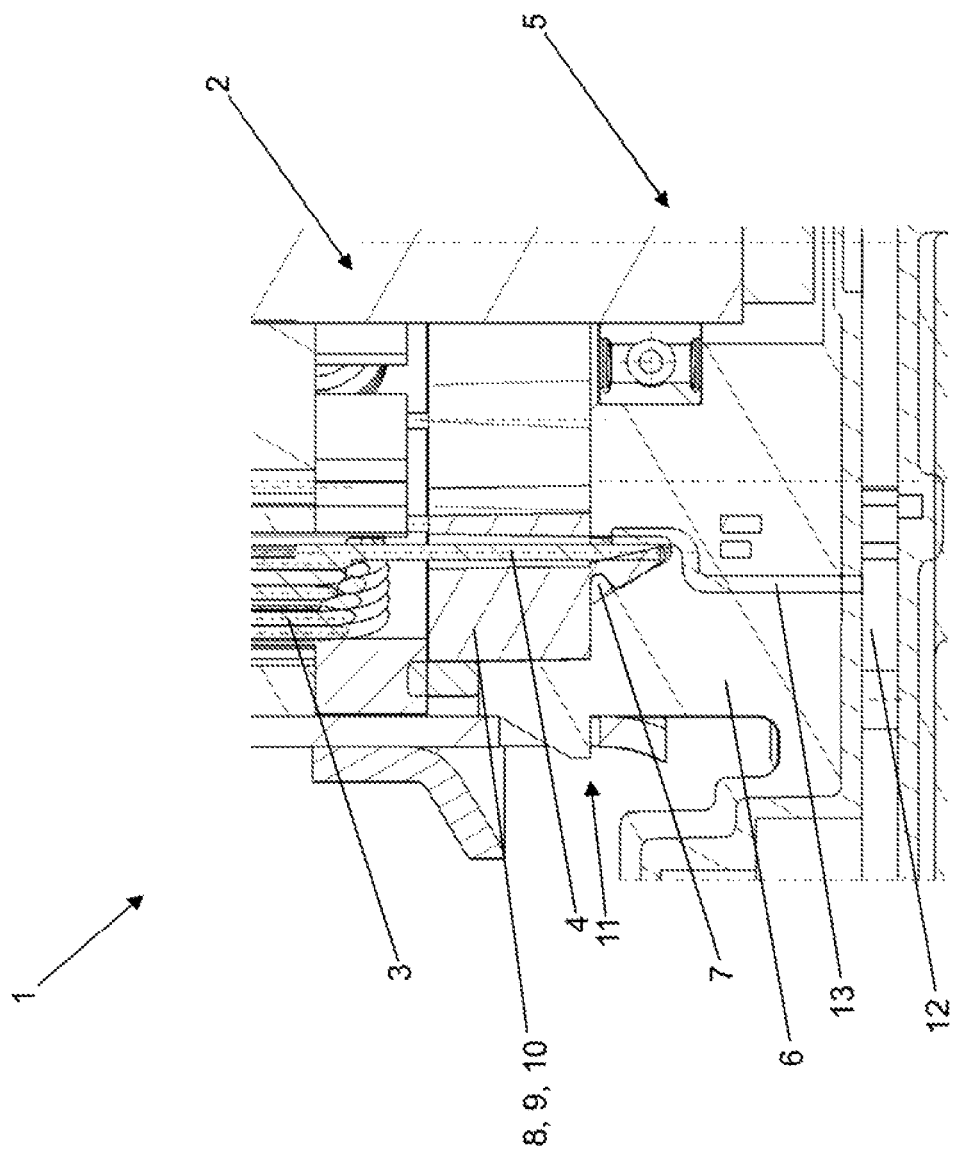
FIG. 8 shows a view of a detail of the fourth design variant of a drive arrangement according to FIG. 7, wherein the electrical machine and the control unit are mechanically and electrically connected.

FIG. 1 and FIG. 2 show a first exemplary embodiment of a drive arrangement 1, and FIG. 7 and FIG. 8 show a fourth exemplary embodiment of a drive arrangement 1, wherein FIG. 1 and FIG. 7 show the drive arrangement 1 in a state in which the electrical machine 2 is neither mechanically nor electrically connected to the control unit 5. FIG. 2 and FIG. 8 show the drive arrangement 1 in a state in which the electrical machine 2 is mechanically and electrically connected to the control unit 5.

In both of these exemplary embodiments of the drive arrangement 1, specifically the first exemplary embodiment and the fourth exemplary embodiment, the electrical machine 2 and the control unit 5 are mechanically connected by means of a plug-in connection 11 (FIG. 2, FIG. 8).

In the first exemplary embodiment of the drive arrangement 1 shown in FIG. 1 and FIG. 2 and the fourth exemplary embodiment of the drive arrangement 1 shown in FIG. 7 and FIG. 8, the electrical machine 2 is electrically connected to the control unit 5 by the winding ends 4 of a respective winding 3 being guided in each case into the contact-making receiving openings 7 during the process of mechanically connecting the electrical machine 2 and the control unit 5 and being clamped there in each case by means of a sliding part 8 and a bending part 9. The respective sliding parts 8 and bending parts 9 are each integrally formed as an insert part 10 in FIG. 1 and FIG. 2 and also in FIG. 7 and FIG. 8.

The insert part 10 in each case also serves as a winding protection means, so that the respective winding end 13 cannot be bent excessively, but rather only in a targeted manner by means of the respective insert part 10.

In FIG. 7 and FIG. 8, the insert parts 10 each have a guide opening 16, wherein the winding ends 4 of the respective winding 3 are each guided through the guide opening 16.

The insert parts 10 are each arranged between the electrical machine 2 and the control unit 5 in the region of the respective contact-making receiving opening 7 (FIG. 2, FIG. 8). During the process of mechanically connecting the electrical machine 2 and the control unit 5, the insert parts 10 can each be displaced and deformed relative to the housing 6, more precisely the respective contact-making receiving opening 7, in such a way that the respective winding end 4 is clamped in the respective contact-making receiving opening 7 such that electrical contact is established between the electrical machine 2 and the control unit 5.

The contour of the respective insert part 10 and that of the respective contact-making receiving opening 7 are formed in such a way that the respective insert part 10 is displaced and deformed during the process of mechanically connecting the electrical machine and the control unit 5.

Figure 3:
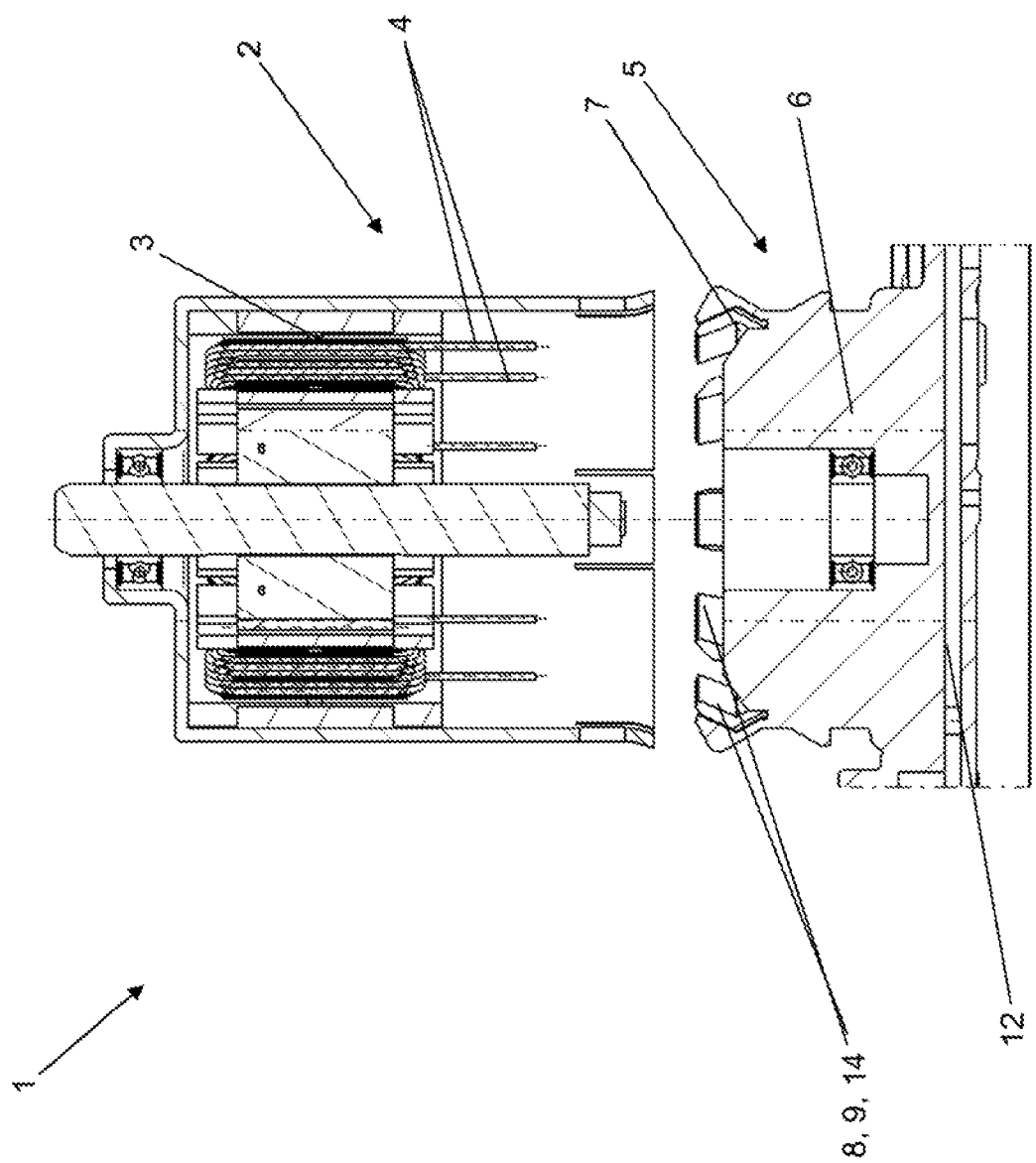
FIG. 3 shows a sectional view of a second design variant of an exemplary drive arrangement, wherein the electrical machine and the control unit are neither mechanically nor electrically connected.
Figure 4:
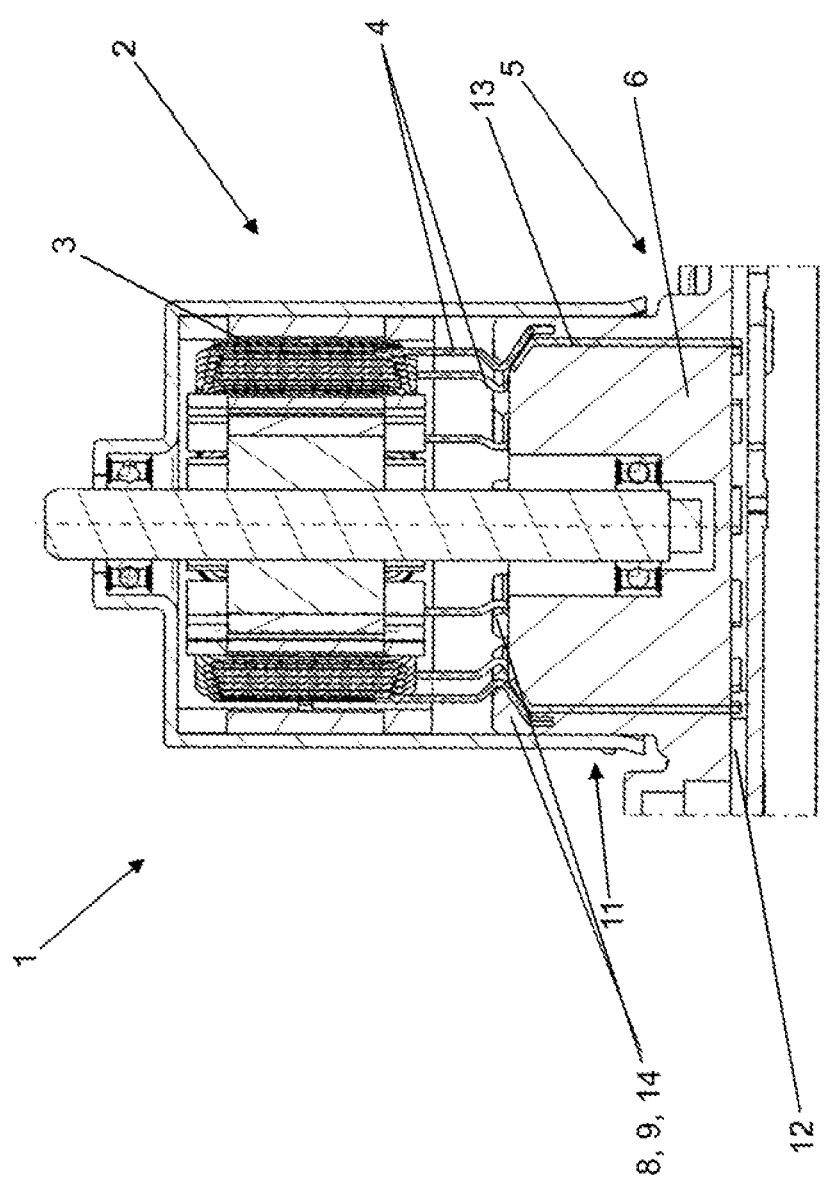
FIG. 4 shows a sectional view of the second design variant of a drive arrangement according to FIG. 2, wherein the electrical machine and the control unit are mechanically connected.
Figure 5:
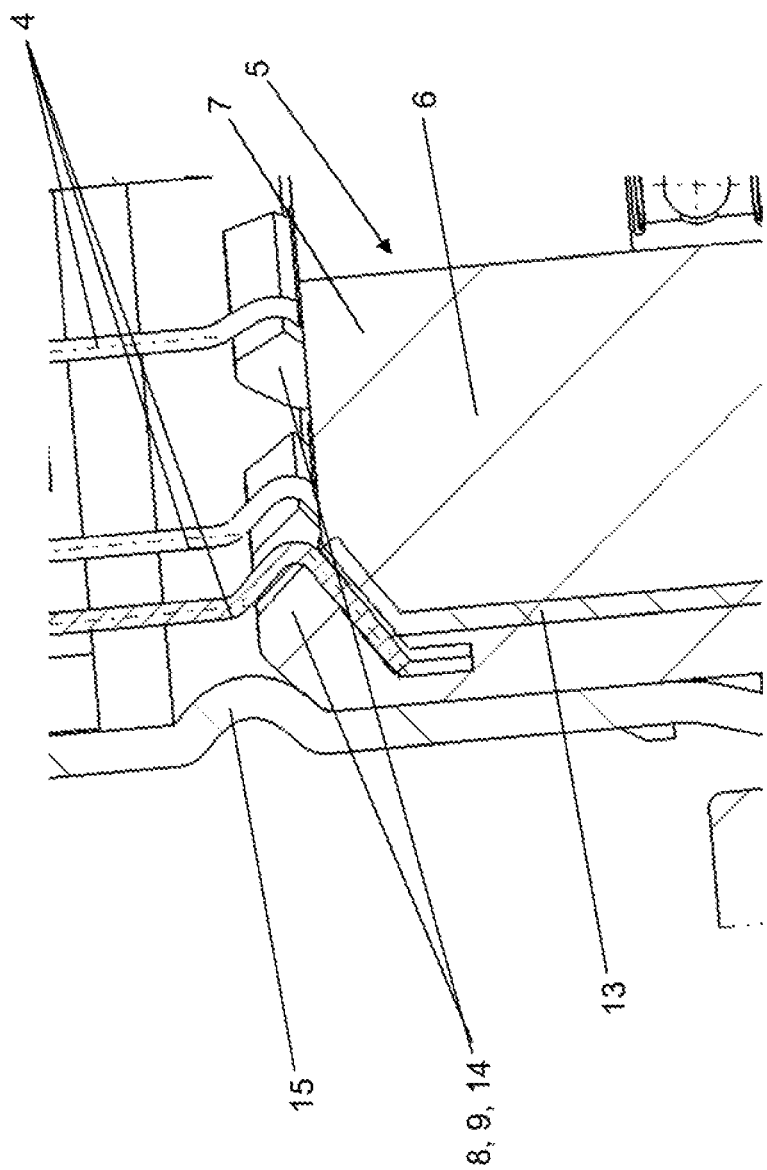
FIG. 5 shows a view of a detail of the second design variant of a drive arrangement according to FIG. 4.

FIG. 3, FIG. 4 and FIG. 5 show a second exemplary embodiment of a drive arrangement 1. FIG. 3 shows the drive arrangement 1 in a state in which the electrical machine 2 is neither mechanically nor electrically connected to the control unit 5. FIG. 4 and FIG. 5 show the drive arrangement 1 in a state in which the electrical machine 2 is mechanically and electrically connected to the control unit 5.

The electrical machine 2 and the control unit 5 are mechanically connected by means of a plug-in connection 11 in the second exemplary embodiment of the drive arrangement too (FIG. 4, FIG. 5).

In the second exemplary embodiment of the drive arrangement 1 shown in FIG. 3, FIG. 4 and FIG. 5, the electrical machine 2 is electrically connected to the control unit 5 by the winding ends 4 of a respective winding 3 being guided in each case into the contact-making receiving openings 7 and being clamped there in each case by means of a bending part 9. The respective bending parts 9 are integrally formed with the housing 6 of the control unit 5.

As shown in FIG. 3 by way of example, a plurality of tabs 14 are formed in a uniformly distributed manner along the periphery of the housing 6 of the control unit 5 on that side which faces the electrical machine 2. A tab 14 delimits in each case one contact-making receiving opening 7 on one side. During the process of mechanically connecting the electrical machine 2 and the control unit 5, the tabs 14 can each be deformed in such a way that the respective winding end 4 is clamped in the respective contact-making receiving opening 7 such that electrical contact is established between the electrical machine 2 and the control unit 5. During the process of mechanically connecting the electrical machine 2 and the control unit 5, the tabs 14 are deformed, more precisely bent, in the direction of the housing 6 of the control unit 5, as shown in FIG. 5, as a result of which the respective contact partners, specifically the respective winding end 4 and the respective contact element 13, are mechanically and electrically connected. This connection can be additionally secured by forming a groove 15 on the electrical machine 2, specifically on a housing 6 of the electrical machine 2. The groove 15 can be formed before or after assembly. Electrical contact is permanently maintained by mechanically connecting the control unit 5 and the electrical machine 2 by means of the plug-in connection 11.

Figure 6:
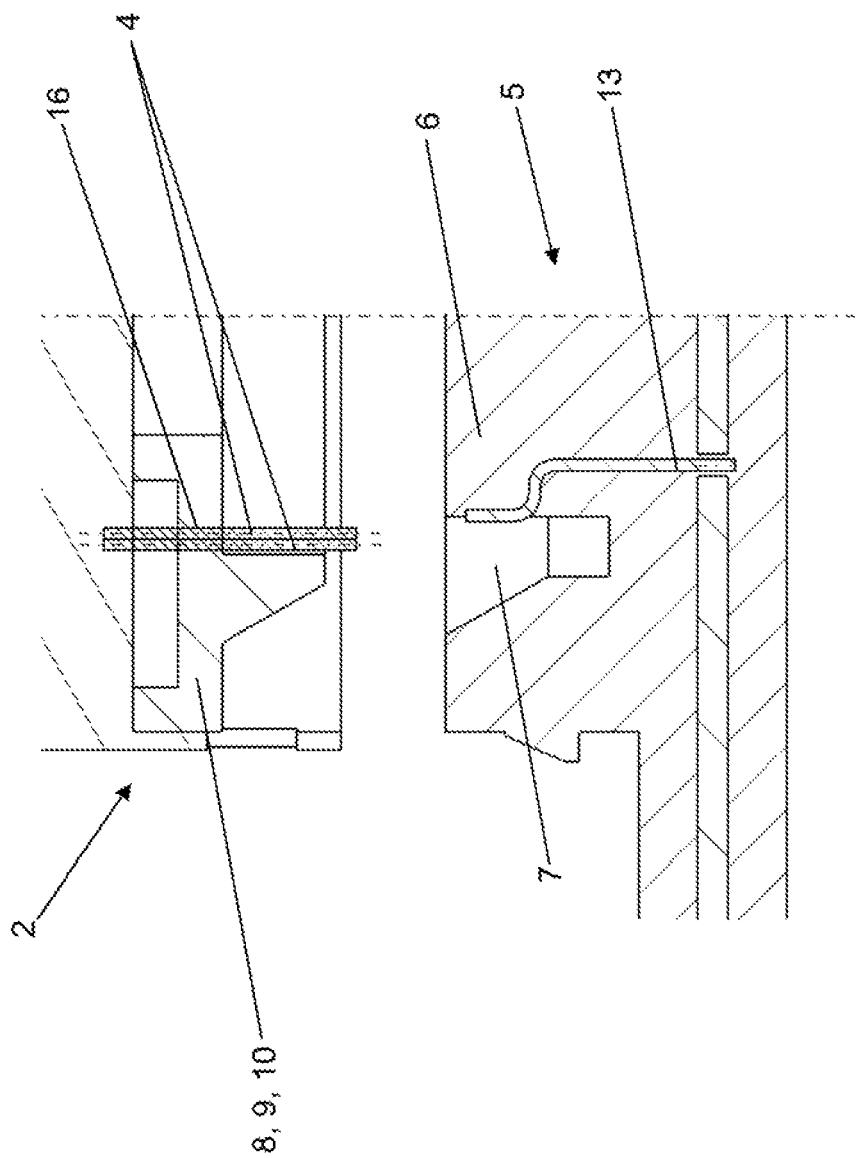
FIG. 6 shows a sectional view of a third design variant of an exemplary drive arrangement, wherein the electrical machine and the control unit are neither mechanically nor electrically connected.
Figure 9:
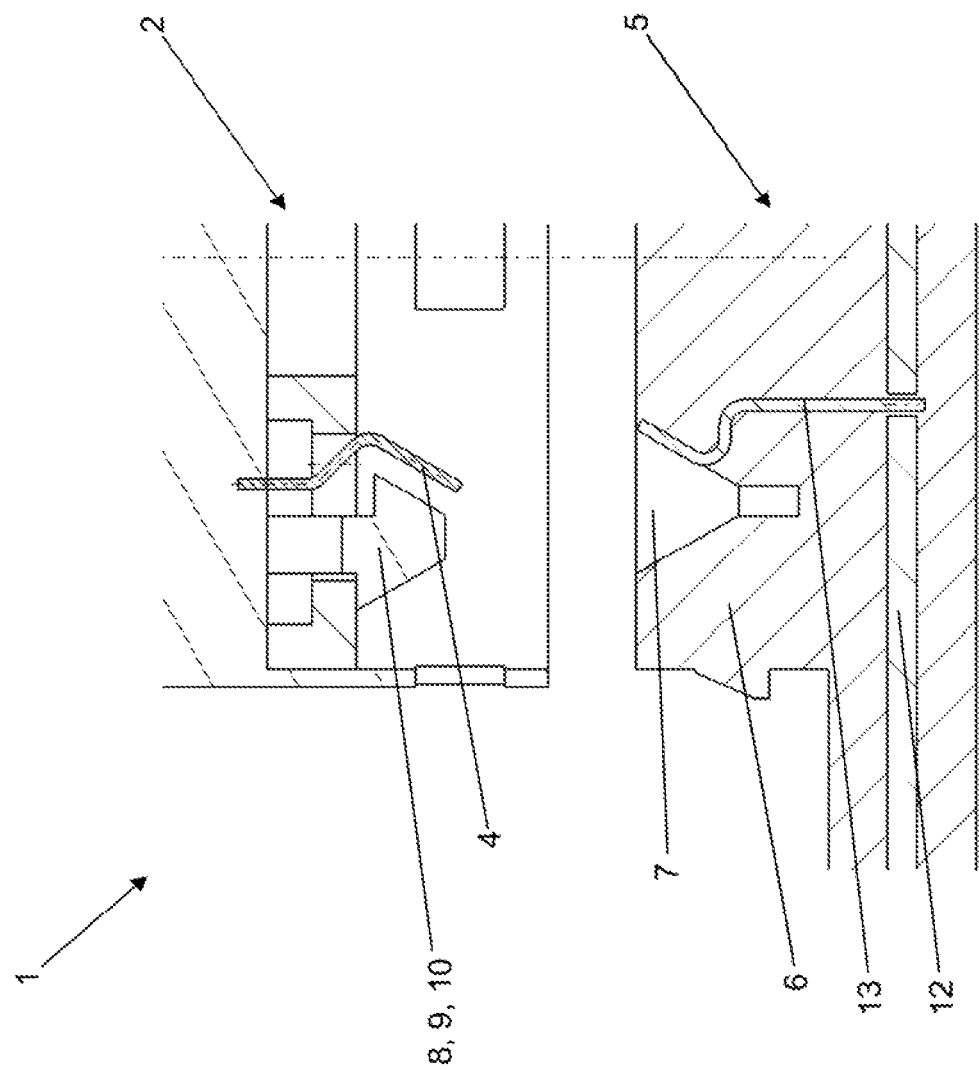
FIG. 9 shows a sectional view of a fifth design variant of an exemplary drive arrangement, wherein the electrical machine and the control unit are neither mechanically nor electrically connected.
Figure 10:
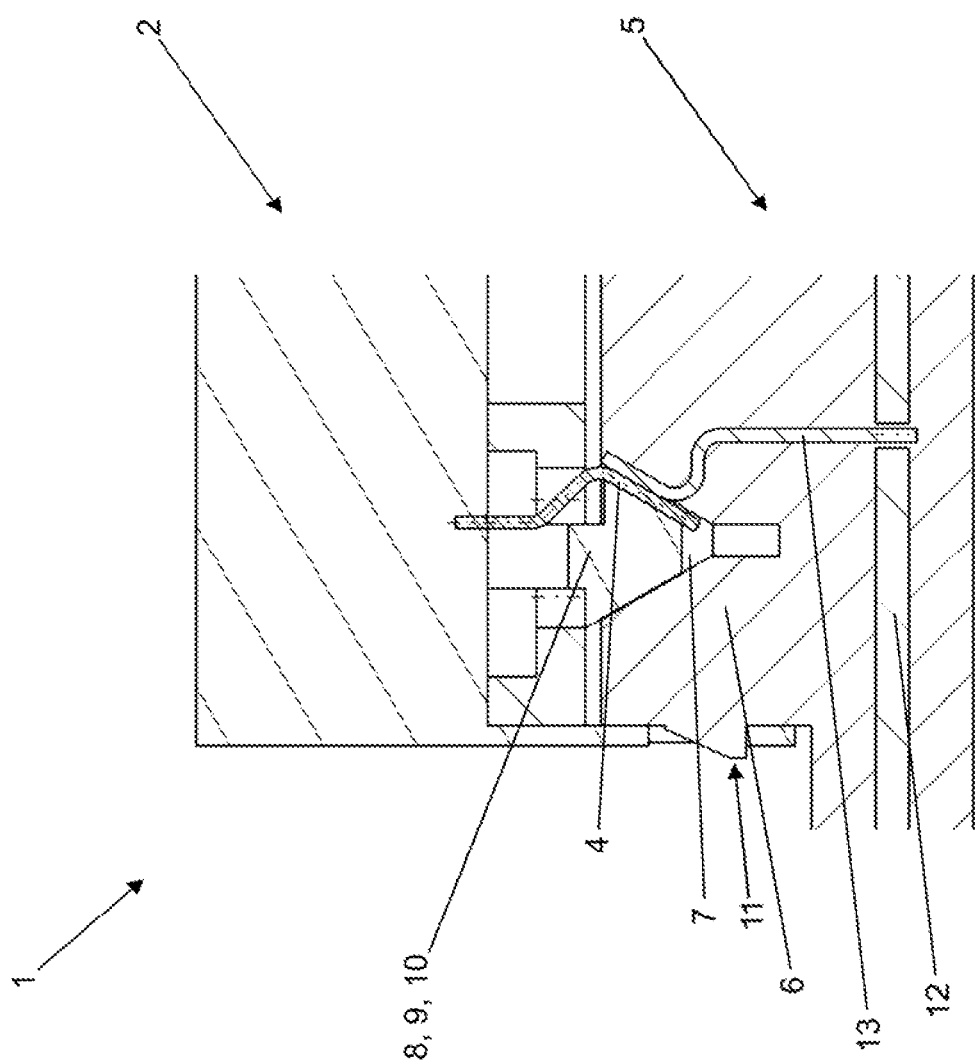
FIG. 10 shows a sectional view of the fifth design variant of a drive arrangement according to FIG. 9, wherein the electrical machine and the control unit are mechanically and electrically connected.

FIG. 6 shows a third exemplary embodiment of a drive arrangement 1, and FIG. 9 and FIG. 10 show a fifth exemplary embodiment of a drive arrangement 1, wherein FIG. 6 and FIG. 9 show the drive arrangement 1 in a state in which the electrical machine 2 is neither mechanically nor electrically connected to the control unit 5. FIG. 10 shows the drive arrangement 1 according to the fifth exemplary embodiment in a state in which the electrical machine 2 is mechanically and electrically connected to the control unit 5.

In the third exemplary embodiment of the drive arrangement, the electrical machine 2 and the control unit 5 are mechanically connected by means of a plug-in connection 11—the mechanical and electrically connected state of the electrical machine 2 and the control unit 5 according to the third exemplary embodiment of the drive arrangement 1 is not illustrated in the figures.

In the fifth exemplary embodiment of the drive arrangement, the electrical machine 2 and the control unit 5 are mechanically connected by means of a plug-in connection 11 (FIG. 10).

In the third exemplary embodiment of the drive arrangement 1 shown in FIG. 6 and the fifth exemplary embodiment of the drive arrangement 1 shown in FIG. 9 and FIG. 10, the electrical machine 2 is electrically connected to the control unit 5 by the winding ends 4 of a respective winding 3 of the electrical machine 2 being guided in each case into the contact-making receiving openings 7 during the process of mechanically connecting the electrical machine 2 and the control unit 5 and being clamped there in each case by means of a sliding part 8. The respective sliding parts 8 are each formed as an insert part 10.

In FIG. 6, the insert parts 10 each have a guide opening 16, wherein the winding ends 4 of the respective winding 3 are guided through in each case through the guide opening 16. Furthermore, the insert part 10 in each case serves as a winding protection means, so that the respective winding end 13 cannot be bent excessively, but rather only in a targeted manner by means of the respective insert part 10.

In a mechanically connected state of the electrical machine 2 and the control unit 5, the insert parts 10 are each arranged between the electrical machine 2 and the control unit 5 in the region of the respective contact-making receiving opening 7. During the process of mechanically connecting the electrical machine 2 and the control unit 5, the insert parts 10 can each be displaced relative to the housing 6, more precisely the respective contact-making receiving opening 7, in such a way that the respective winding end 4 is clamped in the respective contact-making receiving opening 7 such that electrical contact is established between the electrical machine 2 and the control unit 5.

The contour of the respective insert part 10 and that of the respective contact-making receiving opening 7 are formed in such a way that the respective insert part 10 is displaced during the mechanical connection of the electrical machine 2 and the control unit 5.

LIST OF REFERENCE SIGNS

1 Drive arrangement
2 Electrical machine
3 Winding
4 Winding end
5 Control unit
6 Housing
7 Contact-making receiving opening
8 Sliding part
9 Bending part
10 Insert part
11 Plug-in connection 12 Printed circuit board
13 Contact element
14 Tab
15 Groove
16 Guide opening

The invention claimed is:

1. A drive arrangement comprising an electrical machine having at least one winding which has at least one winding end, and comprising a control unit, wherein the control unit has a housing with at least one contact-making receiving opening and a printed circuit board encased by the housing, wherein a contact element is electrically connected to the printed circuit board and is exposed in each of the contact-making receiving openings, wherein the electrical machine and the control unit can be mechanically connected, and wherein at least one winding end of the winding of the electrical machine can be guided into the contact-making receiving opening and can be clamped in the contact-making receiving opening by at least one of a displaceable sliding part and a deformable bending part, so that at least one winding end of the winding of the electrical machine can be electrically connected to the contact element.

2. The drive arrangement as claimed in claim 1, wherein the bending part is designed such that it deforms during the process for mechanically connecting the electrical machine and the control unit.

3. The drive arrangement as claimed in claim 1, wherein the sliding part is designed such that it is displaced during the process for mechanically connecting the electrical machine and the control unit.

4. The drive arrangement as claimed in claim 1, wherein the sliding part and the bending part are each in the form of a separate component or are integrally formed.

5. The drive arrangement as claimed in claim 1, wherein the bending part is integrally formed with the housing of the control unit.

6. The drive arrangement as claimed in claim 1, wherein at least one of the sliding part and the bending part is in the form of an insert part.

7. The drive arrangement as claimed in claim 1, wherein the electrical machine and the control unit are mechanically connected to one another by a plug connection.

* * * * *